United States Patent [19]

Schneider

[11] Patent Number: 4,749,395

[45] Date of Patent: Jun. 7, 1988

[54] PROCESS FOR PRODUCING A GLASS BODY

[75] Inventor: Hartmut Schneider, Munich, Fed. Rep. of Germany

[73] Assignee: Siemens Aktiengesellschaft, Berlin and Munich, Fed. Rep. of Germany

[21] Appl. No.: 744,381

[22] Filed: Jun. 13, 1985

Related U.S. Application Data

[62] Division of Ser. No. 536,954, Sep. 28, 1983, Pat. No. 4,547,210.

[30] Foreign Application Priority Data

Sep. 28, 1982 [DE] Fed. Rep. of Germany ....... 3235869

[51] Int. Cl.$^4$ ..................... C03C 25/02; C03C 15/00; C03C 10/00
[52] U.S. Cl. ........................................ 65/3.2; 65/30.1; 65/33
[58] Field of Search ................ 65/3.1, 3.2, 3.12, 3.41, 65/17, 30.1, 32, 33; 501/12; 264/1.5, 56, 60

[56] References Cited

U.S. PATENT DOCUMENTS

| | | | |
|---|---|---|---|
| 2,908,545 | 10/1959 | Teja | 65/2 X |
| 3,314,817 | 4/1967 | Tiede | 501/35 X |
| 3,907,954 | 9/1975 | Mansmann et al. | 264/63 |
| 4,100,240 | 7/1978 | Bassani | 264/108 |
| 4,173,459 | 11/1979 | Aulich et al. | 65/3 |
| 4,250,131 | 2/1981 | Sobel et al. | 264/56 |
| 4,317,668 | 3/1982 | Susa et al. | 501/12 X |
| 4,323,381 | 4/1982 | Matsuyama et al. | 501/12 X |
| 4,324,576 | 4/1982 | Matsuyama et al. | 65/30.1 |
| 4,340,627 | 7/1982 | Herzog et al. | 264/56 |
| 4,414,165 | 11/1983 | Oestreich et al. | 264/1.5 |
| 4,417,910 | 11/1983 | Passaret | 65/2 X |
| 4,419,115 | 12/1983 | Johnson, Jr. et al. | 65/3.12 |
| 4,426,216 | 1/1984 | Satoh et al. | 65/32 |
| 4,547,210 | 10/1985 | Schneider | 65/3.12 |

FOREIGN PATENT DOCUMENTS 2645375  4/1978  Fed. Rep. of Germany.
3136838  5/1982  Fed. Rep. of Germany.
1552518  11/1979  United Kingdom.

OTHER PUBLICATIONS

K. Susa et al, "New Optical Fibre Fabrication Method", *Electronics Letters*, vol. 18, (1982), pp. 499–500.

J. G. Grabmaier et al, "Production of Glass Fibers for Optical Communications", *Chem. Engineering Technology*, vol. 51 (1979), pp. 612–627.

Grabmaier et al, "Production of Glass Fibres for Optical Communication Systems", *Ger. Chem. Eng.*, vol. 3, (1980), pp. 8–20.

Mukherjee "Sol-gel Processes in Glass Science and Technology", *Journal of Non-Crystalline Solids*, vol. 42 (1980), pp. 477–488.

*Primary Examiner*—S. Leon Bashore
*Assistant Examiner*—Michael K. Boyer
*Attorney, Agent, or Firm*—Hill, Van Santen, Steadman & Simpson

[57] ABSTRACT

Preforms for drawing into glass fibers are relatively quickly produced by extruding filaments or tapes from polysiloxanes and/or heteropolysiloxanes and curing such filaments. A cylindrical wound body is produced from such cured filaments by winding such filaments onto an arbor. The wound body is converted, by heating in an oxidizing atmosphere, into an oxide body composed of $SiO_2$ and, under certain conditions, containing doping amounts of select heteroelements present in the heteropolysiloxane. After removal of the arbor, a gas stream containing chlorine gas is flushed at a temperature of about 1000° to 12,000° C. through the oxide body to remove any traces of water and the dry oxide body is sintered into glass at a temperature of about 1200°–1500° C. The tubular preform thereby attained is collapsed and a glass fiber is drawn therefrom. This process is particularly suitable for the fabrication of gradient optical fibers. A desired refractive index profile can already be taken into consideration in the production of the wound body.

27 Claims, 1 Drawing Sheet

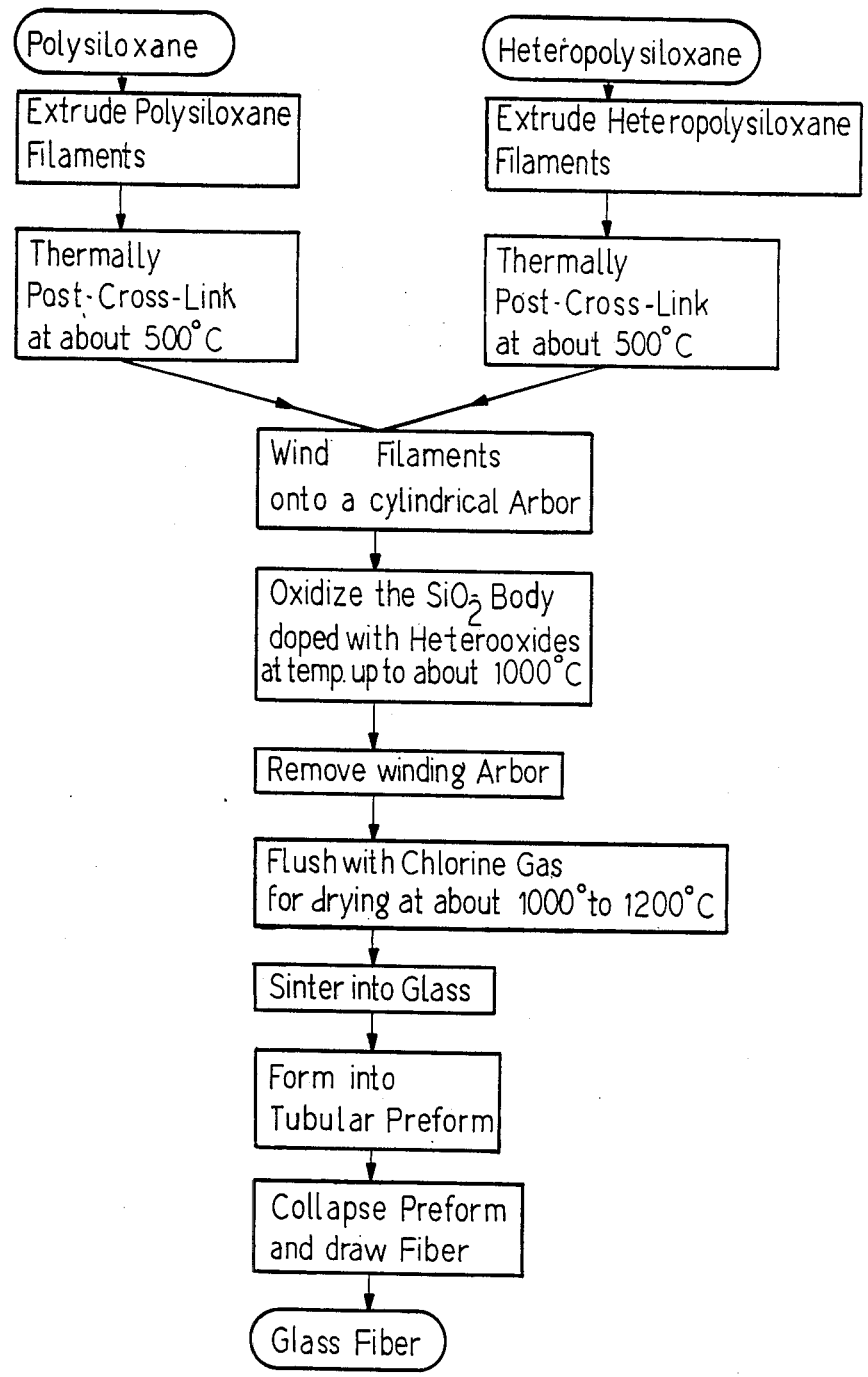

PROCESS FOR PRODUCING A GLASS BODY

This is a division of application Ser. No. 536,954 filed Sept. 28, 1983 which applicant issued as U.S. Pat. No. 4,547,210 on Oct. 15, 1985.

BACKGROUND OF THE INVENTION

1. Field of the Invention

The invention relates to a process for producing a glass body and somewhat more particularly to a method of producing a preform for drawing into a glass light waveguide.

2. Prior Art

A process for optical fiber fabrication wherein silicon-organic materials are chemically converted into glass is known, for example from Electronic Letters, Vol. 18, (1982) pages 499–500. This process adapts a glass production process known as the so-called "sol-gel process" for optical fiber fabrication.

In other known optical fiber fabrication processes (see, for example, Chem. Engineering Technology, Vol. 51, (1979) pages 612–627) preforms for drawing into glass fiber light waveguides are produced by depositing glass from a gaseous phase. High-grade fibers are produced by this technique, however, the production rate is quite low. The rate at which a fiber preform can be produced by depositing glass from a gaseous phase limits the production rate. Maximum rates of about 5 km/h, expressed in equivalent fiber length, have been attained.

Processes of the type initially referred to, which by-pass the gaseous phase are suitable for higher production rates. With known processes of this type, one begins from a silicon alkoxide, i.e., from a silicon-organic material, which is hydrolyzed in its liquid phase and is jelled into a large volume body by means of polycondensation of silicic acid. A glass body can be produced from the resultant gel by means of drying and sintering. Preforms having desired gradient profiles, however, are difficult to produce with this technique.

SUMMARY OF THE INVENTION

The invention provides an improved process of the type initially discussed for rapidly producing glass bodies and with which bodies predetermined refractive indices or gradient profiles can be readily attained.

In accordance with the principles of the invention, a body of a solid silicon-organic material is chemically converted into a desired glass body.

Thus, by following the principles of the invention, one no longer proceeds from a liquid but rather from a solid silicon-organic material and attains glass bodies much more rapidly.

In preferred embodiments of the invention, the solid silicon-organic materials are selected from the class consisting of polysiloxanes, heteropolysiloxanes and mixtures thereof.

The refractive index of a glass body produced in accordance with the principles of the invention can be regulated by the nature of the heteropolysiloxanes utilized. With these solid silicon-organic materials, certain atoms therein can be partially substituted by heteroelements which determine the refractive index. In preferred embodiments, heteropolysiloxanes having at least some Si or O atoms therein, have at least some of their Si or O atoms substituted by at least one heteroelement selected from the group consisting of B, Al, Ga, Ge, Sn, Pb, P, Sb, As, F, Ti, Zr, Nb, Ta, Sc, Y and mixtures thereof and are utilized to attain a desired refractive index.

A particular advantage of polysiloxanes and heteropolysiloxanes, which are also known as silicone caoutchouces, is that these materials can be produced free of foreign metal contaminations from distillable monomers, such as alkyl chlorosilanes.

In certain embodiments of the invention, the solid silicon-organic materials can include a finely dispersed compatible oxide filler material or can be "filled" with such materials. Further, the silicon-organic materials can be admixed with certain compatible hardeners as an aid in producing filaments or tapes from such materials.

In the practice of the principles of the invention, during conversion of a solid silicon-organic material into glass, the body of such material can be heated in an oxidizing atmosphere whereby the C—H components of the silicon-organic material are oxidized and removed while $SiO_2$ and, under certain conditions, oxides of any heteroelements present remain and the oxide body so-attained is sintered into glass.

In certain preferred embodiments of the invention, the above oxidizing atmosphere can be pure oxygen or an oxygen-helium admixture. In certain preferred embodiments, the attained oxide body is sintered into glass at a temperature of about 1200° to 1500° C.

In certain embodiments of the invention, in order to eliminate traces of water that may be present, the oxide body, which is porous, is flushed with a stream of chlorine gas or chlorine gas in a helium carrier stream, at a temperature of about 1000° to 1200° C. before sintering. At these temperatures, hydrogen chloride is formed and can be carried out of the reaction chamber in the moving gas stream.

In certain embodiments of the invention, particularly for production of glass bodies having a predetermined refractive index profile, a wound body of filament-shaped or tape-shaped silicon-organic material is utilized as the starting body.

Predetermined refractive index profiles can be attained by forming a wound body from different filaments and/or tapes. These filaments or tapes can differ both in terms of their composition as well as in terms of their dimension or cross-sectional shapes.

In certain embodiments of the invention, a wound body which exhibits different compositions ply-wise, comprised of different filaments and/or tapes, can be utilized for producing a glass body and is particularly suitable for production of rod-shaped preforms having a radial refractive index profile useful for producing gradient fibers. With this type of wound body, the composition of different filaments and/or tapes can change from ply to ply while the composition can remain constant within one ply. With a cylindrically wound body, this means that the composition of different filaments or tapes changes only in a radial direction while it remains constant in the longitudinal direction. This property is fully retained upon chemical conversion of such a body into glass.

In certain embodiments of the invention, extruded polysiloxane and/or extruded heteropolysiloxane filaments and/or tapes are wound onto a cylindrical arbor. In certain preferred embodiments, the arbor comprises a ceramic rod, preferably composed of $Al_2O_3$, which can be provided with a relatively thin coating of an organic polymer release agent.

In certain embodiments of the invention, a polysiloxane filament or tape and a heteropolysiloxane filament or tape are simultaneously wound onto an arbor and/or a filament or tape composed of a polysiloxane/heteropolysiloxane mixture of constant or variable composition is wound onto an arbor and/or a composite filament or tape having a core and a jacket is wound onto an arbor, with the core being composed, for example, of a heteropolysiloxane or a polysiloxane and the jacket being composed of, for example, a polysiloxane or, respectively, a heteropolysiloxane.

In certain embodiments of the invention as set forth above, a wound body of filaments or tapes of silicon-organic material is formed by beginning the winding with a high component of heteropolysiloxane filaments, threads or tapes and then gradually reducing this component as the winding proceeds.

Likewise, in certain embodiments of the invention as set forth above, a polysiloxane filament or tape of a select diameter and a relatively thicker heteropolysiloxane filament or tape are wound simultaneously into a body and the relatively higher heteropolysiloxane component so-attained in an initially wound body is reduced by a cross-sectional change whereupon, under certain conditions, only polysiloxane filaments or tapes are then applied.

In certain embodiments of the invention, filaments, threads or tapes utilized in forming a select body composed of a silicon-organic material, are produced by extruding such material and curing the same by a subsequent thermal treatment, preferably at a temperature of about 500° C. Further, compatible hardening agents can be initially added to the silicon-organic materials and function, on the one hand, as a means for shape retention of the extruded filaments or tapes and, on the other hand, as a means of preventing vaporization of the siloxanes during subsequent steps involving thermal treatment. Additionally, filaments or tapes can be composed of a polysiloxane/heteropolysiloxane mixture having a composition which is set or varied by an appropriate mixing means connected to the input end of an extruder.

In certain embodiments, the winding arbor utilized to organize the filaments or tapes of the silicon-organic material into a desired body, is removed from such body after the chemical conversion (oxidation) of the filaments or tapes making-up the body. The resultant oxide body can be readily removed from the arbor after incineration of a releasing agent, which may be present on the winding arbor.

BRIEF DESCRIPTION OF THE DRAWINGS

The invention will be further explained in somewhat greater detail below, referring to an exemplary embodiment and the flow diagram illustrated in the FIGURE.

DESCRIPTION OF THE PREFERRED EMBODIMENTS

As shown in the flow diagram, a select polysiloxane and a select heteropolysiloxane are utilized as the base or initial starting materials. These starting materials can be premixed with one or more finally dispersed oxide fillers, a compatible hardener and/or with one another in a desired ratio and then fed to the input end of an extrusion means.

In the embodiment illustrated, a base polysiloxane material is fed to an extruder and polysiloxane filaments or the like of a desired cross-sectional shape and dimension are extruded from the base polysiloxane material.

These extruded polysiloxane filaments or tapes are cured by means of a brief, thermal post-cross-linking reaction at a temperature of about 500° C.

Simultaneously, a base heteropolysiloxane material (with or without one or more heteroelement atoms therein) is fed into an extruder and heteropolysiloxane filaments or the like of a desired shape and diameter are extruded from the base heteropolysiloxane material and are cured by means of a brief, thermal post-cross-linking reaction at a temperature of about 500° C.

As earlier mentioned, the curing step, with the use of a previously added hardener, functions on the one hand, for shaped retention of the formed filaments, tapes or threads and, on the other hand, for preventing undue vaporization of the siloxanes during subsequent steps involving thermal treatment.

The cured siloxane polymer filaments or tape are then wound onto a cylindrical arbor. The arbor comprises a ceramic rod, which has been composed, for example, of $Al_2O_3$ and has been provided with a relatively thin coating of a compatible organic polymer functioning as a release agent.

The wound body generated by winding the filaments onto the arbor is generally cylindrical in shape. A predetermined radial refractive index profile determines the compositions of the filaments to be wound into the body. When, for example, a core-jacket fiber, i.e., a fiber having a stepped refractive index profile, is to be produced, then one can proceed in such a manner that, first, a polysiloxane filament and a heteropolysiloxane filament are simultaneously wound onto the arbor so that a number of plies having this filament composition is produced. Next, only a polysiloxane filament is wound onto the earlier wound plies so that an outer layer of a number of plies containing only polysiloxane arises. The core of the fiber is later generated from the inner plies of the polysiloxane and the heteropolysiloxane filaments and the jacket of the optical fiber is generated from the outer plies of polysiloxanes.

Instead of two filaments as set forth above, a single filament composed of a polysiloxane/heteropolysiloxane mixture can also be extruded, with the composition thereof being set or continuously varied by a mixing unit connected to the input of an extruder. A composite filament having a core and a jacket can also be utilized, consisting, for example, of heteropolysiloxane in the core and polysiloxane in the jacket.

In the production of a gradient optical fiber, the filament composite can be gradually altered ply-by-ply as required. For example, one could begin building or winding a body with a high component of a select heteropolysiloxane filament, which during the course of time, is gradually allowed to decrease toward the outside of the body and, under certain conditions, only polysiloxane filaments are then put in place so that later these polysiloxane filaments form a jacket of the ultimately attained gradient fiber. The polysiloxane component of a body can, for example, also be regulated by the cross-sections of a heteropolysiloxane filament applied simultaneously with a polysiloxane filament. When the cross-section of the heteropolysiloxane filament is continuously changed during winding, then the heteropolysiloxane component also changes continuously. In a specific example, winding of a body began with a heteropolysiloxane filament which was thicker than the simultaneously applied polysiloxane filament and the diameter of the heteropolysiloxane filament was gradually allowed to decrease to zero, whereupon only the polysiloxane filament was applied or wound to form an outer layer of the body.

In order to convert the wound body into a glass body, the wound body is heated in an $O_2$ or an $O_2$—He atmosphere at temperatures up to about 1000° C. so that the C—H components of the siloxanes are removed by way of oxidation. In this manner, an oxide body of $SiO_2$ is attained, which, under certain conditions, contains oxides of the heteroelements contained in the initially applied heteropolysiloxanes. The high gas permeability produced by the filament interstices of the wound body is advantageous in further processing and guarantees a more uniform and faster conversion to $SiO_2$ throughout the cross-section of the body. A tendency of the body to flake is thereby reduced and undesirable silicon carbide formation is suppressed.

Heating of the wound body is preferably slowly executed at temperatures of from about 0° ... 1000° C. and most preferably at about 300° through 600° C. (in about 3 to 24 hours). In this manner, swelling of the siloxanes, due to a too fast development of reaction gases, can be avoided. Otherwise, a blistery and voluminous material having a low consistency could be obtained.

The winding arbor is expediently removed from the oxide body after the thermal-oxidation. Typically, the arbor is easily withdrawn from the oxide body after incineration of the releasing agent initially applied onto the arbor.

In order to eliminate traces of water that may be present, the porous oxide body is then flushed with a heated gas stream comprised of either chlorine gas or a mixture of chlorine gas in helium. Hydrochloric acid is formed at temperatures of about 1000° to 1200° C. and is carried out of the reaction or drying chamber with the moving gas stream.

After drying, the oxide body is sintered into glass at a temperature of about 1200° to 1500° C. A transparent glass tube results which is now collapsed into a solid rod in a drawing furnace at a temperature of about 1900° C. and is substantially simultaneously drawn into a glass fiber.

An advantage of the inventive process described above is that a directed, highly focused material stream having a relatively high velocity up to the cold preform can be readily realized.

The invention is further illustrated by reference to the following exemplary aspects of the invention. Those skilled in the art will appreciate that other and further embodiments are obvious and within the spirit and scope of this invention, from the teachings of the present examples, taken in conjunction with the accompanying specification.

EXAMPLE 1

Preparation of the Polysiloxanes and the Heteropolysiloxanes

Methods for the preparation of polysiloxanes are widely known from the literature (e.g., W. Noll, Chemie und Technologic der Silicone, Verlog Chemi, Weinheim, 1968 and cited literature).

For example, a mixture of dimethyl-dichlorosilane, trimethyl-chlorosilane and methyl-trichlorosilane in a molar ratio of about 100:10:1 is prepared and hydrolyzed by the addition of water. The resulting hydroxy silanes polymerize into silicone polymers. For increased cross-linkage, after extrusion of these branched chain molecules, it is recommended to add vinyl groups ($CH_2$=CH—), e.g., in the form of trivinyl-chlorosilane, to the mixture before hydrolization. Typical molar mixing ratios are 1:500 to 1:10,000, vinyl to methyl group.

In the preparation of the heterosubstituted silicones, part of the methyl-chlorosilanes in the above described batch are substituted by tetrachloro germanium, $GeCl_4$, or by dimethyl-dichloro-germanium, $(CH_3)_2GeCl_2$, in a molar ratio of about 1:20 up to about 1:5 germanium to silicon compounds. Of course, other heteroelements can be similarly utilized to prepare a desired heteroelement polysiloxane.

EXAMPLE 2

Addition of Filling Materials

In order to achieve a high mass fraction of inorganic constituents in the silicon-organic material utilized in producing glass bodies, up to about 50% by weight of silica ($SiO_2$) and germania ($GeO_2$) are added to the hydroxy silane bath in a finely dispersed form. Both of these inorganic filler materials are obtained in small grained and highly pure form by flame hydrolysis of tetrachlorosilane and tetrachlorogermane. This occurs by injection of the vaporized compounds in an oxyhydrogen flame at temperatures between 700° to 1500° C., followed by an air quenching of the gas stream and filtering off the resultant particular material from the cooled stream. Pyrogenic silicas of this type as well as other heteroelement oxides are commercially available.

EXAMPLE 3

Extrusion and Filament Preparation

Before the extrusion of a viscous polymeric batch, about 0.6 to 1.2% by weight of organic peroxides, e.g., dibenzylperoxide or bis-(2,4-dichlorobenzoyl)-peroxide, are added by homogeneous dispersion as a cross-linking and thereby hardening agent. The extruded viscous filaments are cured within a short furnace at a temperature between about 300° and about 500° C., with a residence time ranging between about 1 and 10 seconds to yield elastic rubber-like filaments. The cross-section of these filaments ranges between about 1 and 10 $mm^2$. With this procedure, a filament with a constant germanium content can be fabricated. Changing the composition of the silicone flow into the extruder by using two batch reservoirs, one containing the heteropolysiloxane, allows production of a filament having a variable germanium content along the length thereof.

EXAMPLE 4

Winding of a Filament

An extruded filament is layerwise wound onto a rotating and axially to and fro shifting arbor. To obtain a preform for a step index fiber, first a germanium doped rubber-like silicone fiber is wound. This first body is the precursor material for the fiber core. Then a germanium-free filament is wound onto this first body as the cladding material. The total diameter of the composite body is typically about 10 cm. The diameter ratio of the core and cladding region depends upon the target fiber dimensions, e.g., 40% core regions for a multi-mode fiber and 6% core regions for a single-mode fiber having a 125 $\mu$m diameter.

To obtain a preform for a gradient-index fiber, one way is to wind simultaneously two filaments, one such filament being doped with germanium. The cross-section of the latter is continuously and linearly reduced with time until the core region is completed In this manner, a parabolic germanium concentration profile results, with a maximum concentration in the central region.

A second way is to wind one filament with a continuously decreasing germanium concentration. The molar mass flow rate of germania to silica precursors is adjusted in such a way that the total molar flow rate is kept constant and the germania flow rate is decreased linearly with time, down to zero at the core cladding boundary. Thereby and by the effect of a decreasing diameter growing rate of the cylindrical body, a parabolic germania profile is achieved, which results in a corresponding index profile.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim as my invention:

1. A process of producing a glass body preform for use in drawing a glass light waveguide, said process comprising the steps of producing filaments composed of a silicon-organic material with at least one filament being of a different composition from the other filament to provide different filaments of different compositions, winding said different filaments into a wound body of said silicon-organic material, and then chemically converting the silicon-organic material into glass to convert the wound body into a glass body preform having at least two layers of a different composition, said chemically converting including oxidizing the material, drying the oxidized material, and then sintering the oxidized material into the glass body.

2. A process as defined in claim 1, wherein said solid silicon-organic material is at least one silicon-organic compound selected from the class consisting of polysiloxanes, heteropolysiloxanes and mixtures thereof.

3. A process as defined in claim 2, wherein said heteropolysiloxanes have at least some Si or O atoms thereof substituted by at least one heteroelement selected from the group consisting of B, Al, Ga, Ge, Sn, Pb, P, Sb, As, F, Ti, Zr, Nb, Ta, Sc, Y and mixtures thereof.

4. A process as defined in claim 1, wherein said solid silicon-organic material includes one or more finally dispersed compatible oxide filler materials.

5. A process as defined in claim 1, wherein during said chemical conversion of said solid silicon-organic material into a glass body, said body is heated in an oxidizing atmosphere whereby the C—H components of said silicon-organic material are oxidized and removed while $SiO_2$ and oxides of heteroelements remain, and the oxide body so-attained is sintered into glass.

6. A process as defined in claim 5, wherein said body is heated in an oxygen atmosphere or an oxygen-helium atmosphere.

7. A process as defined in claim 5, wherein said heating occurs in a period of 3 to 24 hours at temperatures ranging from about 300° through 600° C.

8. A process as defined in claim 5, wherein said oxide body is sintered into glass at a temperature ranging from about 1200° through 1500° C.

9. A process as defined in claim 5, wherein, said drying comprising said oxide body being flushed with a heated gas stream composed of chlorine gas or a mixture of chlorine gas in helium, said gas stream being heated to a temperature in the range of about 1100° to 1200° C.

10. A process as defined in claim 3, wherein said filaments composed of said silicon-organic material are wound onto an arbor for producing said wound body.

11. A process as defined in claim 10, wherein said arbor is cylindrically-shaped.

12. A process as defined in claim 11, wherein said arbor is a ceramic rod.

13. A process as defined in claim 12, wherein said ceramic rod is composed of $Al_2O_3$.

14. A process as defined in claim 10, wherein said arbor includes a relatively thin coating on its outer surface composed of an organic polymer release agent.

15. A process as defined in claim 10, wherein a polysiloxane filament and a heteropolysiloxane filament are simultaneously wound onto said arbor to form the wound body.

16. A process as defined in claim 10, wherein a filament composed of a polysiloxane/heteropolysiloxane mixture of constant or variable composition is wound onto said arbor to form the wound body.

17. A process as defined in claim 10, wherein a composite filament having a core and a jacket is wound onto said arbor to form the wound body, said core being composed of a heteropolysiloxane or a polysiloxane and said jacket being composed of a polysiloxane or, respectively, a heteropolysiloxane.

18. A process according to claim 1, wherein the step of producing filaments includes extruding the silicon-organic material into filaments and then curing the extruded filaments by a subsequent thermal treatment.

19. A process as defined in claim 18, wherein said filaments are cured by a thermal treatment comprising heating said filaments to a temperature in the range of about 500° C.

20. A process as defined in claim 18, wherein a compatible hardening agent is admixed with said silicon-organic material prior to extrusion thereof into filaments.

21. A process as defined in claim 18, wherein said cured filaments are wound onto an arbor to form said wound body, said wound body being heated in an oxidizing atmosphere at a temperature in the range up to about 1000° C. so as to chemically convert said silicon-organic material into an oxide material containing $SiO_2$, and removing said arbor after said conversion.

22. A process according to claim 1, wherein the step of winding the different filaments wind the filaments as plies with one filament for each ply so that the plies have different compositions.

23. A process according to claim 1, wherein the step of winding the different filament forms plies with the composition of the filaments changing ply-to-ply and remaining constant within a single ply.

24. A process according to claim 1, wherein said step of winding produces a cylindrical wound body with plies and the composition of the filaments of each ply changes only in a radial direction of said body while remaining constant in a longitudinal direction of said body.

25. A process according to claim 16, wherein said step of producing filaments provides filaments of a class consisting of polysiloxanes, heteropolysiloxanes and mixtures thereof and said step of winding starts with filaments having a relatively high component of the heteropolysiloxanes and then uses filaments having a reduced amount of the component.

26. A process according to claim 25, wherein a polysiloxane filament of a given diameter and a relatively thicker heteropolysiloxane filament are wound simultaneously onto the arbor and the relatively high heteropolysiloxane component thereby produced in the body being formed is reduced by a cross-sectional change of said heteropolysiloxane filament, whereupon said polysiloxane filament is wound to finish producing said wound body.

27. A process according to claim 18, wherein said solid silicon-organic material is selected from the class consisting of polysiloxanes, heteropolysiloxanes and mixtures thereof and wherein the step of producing a filament extrudes a filament composed of a polysiloxane/heteropolysiloxane mixture from an extrusion means and then cures the filament, the composition of said filament being set or varied by a mixing unit connected to an input end of said extrusion means.

* * * * *